(12) United States Patent
Goto et al.

(10) Patent No.: US 7,800,359 B2
(45) Date of Patent: Sep. 21, 2010

(54) RELATIVE ROTATIONAL POSITION DETECTION APPARATUS

(75) Inventors: Atsutoshi Goto, Fuchu (JP); Kazuya Sakamoto, Hamura (JP); Hiroshi Sakamoto, Kawagoe (JP)

(73) Assignee: Amiteq Co., Ltd. (JP)

( * ) Notice: Subject to any disclaimer, the term of this patent is extended or adjusted under 35 U.S.C. 154(b) by 558 days.

(21) Appl. No.: 11/719,822

(22) PCT Filed: Nov. 19, 2004

(86) PCT No.: PCT/JP2004/017291

§ 371 (c)(1),
(2), (4) Date: May 21, 2007

(87) PCT Pub. No.: WO2006/054357

PCT Pub. Date: May 26, 2006

(65) Prior Publication Data

US 2009/0267593 A1    Oct. 29, 2009

(51) Int. Cl.
*G01B 7/30* (2006.01)
(52) U.S. Cl. ............................. 324/207.25; 73/514.39
(58) Field of Classification Search ............ 324/207.25; 73/514.31, 514.39
See application file for complete search history.

(56) References Cited

U.S. PATENT DOCUMENTS

2004/0020309 A1    2/2004    Nagase et al.

FOREIGN PATENT DOCUMENTS

| EP | 1382950 A2 | 1/2004 |
|---|---|---|
| JP | 4-194631 A | 7/1992 |
| JP | 6-34462 A | 2/1994 |
| JP | 2000-55610 A | 2/2000 |
| JP | 2002-48508 A | 2/2002 |
| JP | 2002-107110 A | 4/2002 |
| JP | 2002-310816 A | 10/2002 |
| JP | 2004-45137 A | 2/2004 |
| JP | 2005-55235 A | 3/2005 |

OTHER PUBLICATIONS

Nagase Shigeki, Torque Sensor, Partial English Translation of JP 2004045137, Feb. 12, 2004.*
Relevant portion of International Search Report, mailed on Mar. 22, 2005, in corresponding PCT application: PCT/JP04/17291.
English translation of the International Preliminary Report on Patentability issued in corresponding application No. PCT/ JP2004/ 017291, mailed May 31, 2007.

* cited by examiner

*Primary Examiner*—Bot L LeDynh
(74) *Attorney, Agent, or Firm*—Rossi, Kimms & McDowell LLP (57) ABSTRACT

A first sensor detects a rotational position of a first shaft in a noncontact fashion and generates a first output signal by phase-shifting a reference A.C. signal in accordance with the detected rotational position of the first shaft. A second sensor detects a rotational position of a second shaft in a noncontact fashion and generates a second output signal by phase-shifting the reference A.C. signal in accordance with the detected rotational position of the second shaft. First and second timing signals corresponding to phase shift amounts of the first and second output signals are output via respective output lines. Relative rotational position detection data, representing a rotational difference or amount of torsion between the two shafts, appears in a time difference between the first and second timing signals. A PWM signal, having a pulse width corresponding to a time difference between the first and second timing signals, may be output.

10 Claims, 4 Drawing Sheets

RELATIVE ROTATIONAL POSITION DETECTION APPARATUS

This application is a U.S. National Phase Application of PCT International Application PCT/JP2004/017291 filed on Nov. 19.

TECHNICAL FIELD

The present invention relates to an improved apparatus for detecting a relative rotational position between two shaft sections, which is suitable for use as, for example, a torque sensor for detecting a torsional load applied to a power steering shaft of a motor vehicle.

BACKGROUND ART

As techniques for detecting a torsional amount between two relatively-rotatable shaft sections, there have been well known techniques which are characterized by provision of detection apparatus, such as a potentiometer or resolver apparatus, on input and output shafts interconnected via a torsion bar. According to the above-mentioned technique using a potentiometer, a slider is mounted on the input shaft while a resistor is mounted on the output shaft, so that a position of the slider contacting the resistor varies in accordance with variation in a relative rotational position between the input and output shafts to thereby provide an analog voltage corresponding to the relative rotational position. According to the technique using resolver apparatus, separate resolver apparatus are provided on both of the input and output shafts so as to detect a relative rotational amount (torsional amount) between the two shafts on the basis of angle signals output from the two resolver apparatus. Further, as a means for detecting rotational displacement between two relatively-rotatable shafts, there has been developed a noncontact-type torque sensor for power steering which employs an induction coil.

Inventions disclosed in Japanese Patent Application Laid-open Publication Nos. 2000-55610, 2002-48508, 2002-107110 and 2002-310816 were each proposed with a view to avoiding the drawbacks of the above-discussed conventionally-known techniques, and each of these proposed inventions employs a noncontact-type, induction-or variable-magnetic-coupling-type sensor that uses a coil section and magnetism-responsive member (magnetic member or electrically-conductive member).

The conventional technique of the type using a potentiometer would always suffer from problems, such as poor contact and failure, because it employs a mechanical contact structure. Further, because there occurs impedance variation of the resistance due to temperature changes, it is necessary to appropriately make temperature drift compensation. Further, the conventional rotational-displacement detection apparatus, known as the noncontact-type torque sensor for power steering employing the induction coil, is arranged to measure an analog voltage level produced in response to minute relative rotational displacement, so that it would accomplish only a very poor detecting resolution. Further, in addition to the need to compensate temperature drift characteristics of the coil, there is a need to appropriately compensate temperature drift characteristics present in reluctance of the magnetic member that varies magnetic coupling to the coil in response to a changing relative rotational position as well as in eddy current loss of the electrically-conductive member. Furthermore, the detection apparatus in the inventions disclosed in the aforementioned patent literatures each do not constitute a sensor of a sufficiently simplified construction.

DISCLOSURE OF THE INVENTION

In view of the foregoing, it is an object of the present invention to provide an improved relative rotational position detection apparatus which can achieve a superior temperature-characteristic compensating performance and is yet simple in construction.

According to a first aspect of the present invention, there is provided a relative rotational position detection apparatus for detecting a relative rotational position between first and second shafts rotatable relative to each other, which comprises: a first sensor for detecting a rotational position of the first shaft section in a noncontact fashion and generating a first output signal by phase-shifting a reference A.C. signal in accordance with the detected rotational position of the first shaft section; a second sensor for detecting a rotational position of the second shaft section in a noncontact fashion and generating a second output signal by phase-shifting the reference A.C. signal in accordance with the detected rotational position of the second shaft section; and an output circuit for outputting a first timing signal corresponding to a phase shift amount of the first output signal and a second timing signal corresponding to a phase shift amount of the second output signal, via respective output lines. Here, relative rotational position detection data is outputted via the two output lines extending from the output circuit, and the relative rotational position detection data appears in a time difference between the first timing signal and the second timing signal.

Detection system of the present invention comprises: the aforementioned relative rotational position according to the first aspect of the invention; and a computer which has two input terminals for inputting the signals of the two output lines from the output circuit and which performs a process for acquiring measurement data of the relative rotational position by measuring a time difference between the first timing signal and second timing signal inputted to the input terminals. Because the detection system of the invention can use existing timing-signal capturing input ports of an existing microcomputer, it can perform, with ease and at low cost, the arithmetic process for acquiring measurement data of the relative rotational position.

According to a second aspect of the present invention, there is provided a relative rotational position detection apparatus for detecting a relative rotational position between first and second shafts rotatable relative to each other, which comprises: a first sensor for detecting a rotational position of the first shaft section in a noncontact fashion and generating a first output signal by phase-shifting a reference A.C. signal in accordance with the detected rotational position of the first shaft section; a second sensor for detecting a rotational position of the second shaft section in a noncontact fashion and generating a second output signal by phase-shifting the reference A.C. signal in accordance with the detected rotational position of the second shaft section; and an output circuit for outputting, via an output line, a variable-pulse-width output signal having a pulse width corresponding to a time difference between a first timing signal corresponding to a phase shift amount of the first output signal and a second timing signal corresponding to a phase shift amount of the second output signal. Here, relative rotational position detection data is outputted via the single output line extending from the output circuit, and the relative rotational position detection data appears in a pulse time width of the variable-pulse-width output signal outputted to the single output line.

Detection system of the present invention comprises: the aforementioned relative rotational position detection apparatus according to the second aspect; and a computer having an input terminal for inputting a signal of an output line from the output circuit of the relative rotational position detection apparatus, the computer performing a process for acquiring measurement data of the relative rotational position by measuring a pulse time width of a variable-pulse-width output signal inputted to the input terminal. Because the detection system of the invention can use an existing pulse-time-width (PWM) signal capturing input port of an existing microcomputer, it can perform, with ease and at low cost, the arithmetic process for acquiring measurement data of the relative rotational position.

In the relative rotation position detection apparatus according to the first aspect of the present invention, the relative rotational position detection data is output via the two output lines, so that it is possible to simplify the circuit and terminal constructions. Further, complicated constructions are not required of the first and second sensors, and thus, the construction of the detection apparatus can be even further simplified. As a result, the present invention can provide an inexpensive relative rotation position detection apparatus that requires only a reduced installation space and can minimize failures. Even in a case where some temperature drift errors are contained in the output signals from the first and second sensors, auto relative rotation position detection data, appearing in a time difference between the first and second timing signals output to the two output lines, such temperature drift errors automatically canceled therefrom, and thus, the present invention can achieve a superior temperature-characteristic compensating performance.

In the relative rotation position detection apparatus according to the second aspect of the present invention, the relative rotational position detection data is output via the single output line, so that it is possible to simplify the circuit and terminal constructions. Further, complicated constructions are not required of the first and second sensors, and thus, the construction of the apparatus can be even further simplified. As a result, the present invention can provide an inexpensive relative rotation position detection apparatus that requires only a reduced installation space and can minimize failures. Even in a case where some temperature drift errors are contained in the output signals from the first and second sensors, the variable-pulse-width signal output to the single output line extending from the single output line has such temperature drift errors automatically canceled therefrom because the variable-pulse-width signal represents a time difference between the first and second timing signals, and thus, the present invention can achieve a superior temperature-characteristic compensating performance.

BEST MODE FOR CARRYING OUT THE INVENTION

Now, embodiments of the present invention will be described with reference to the accompanying drawings.

Figure 1:
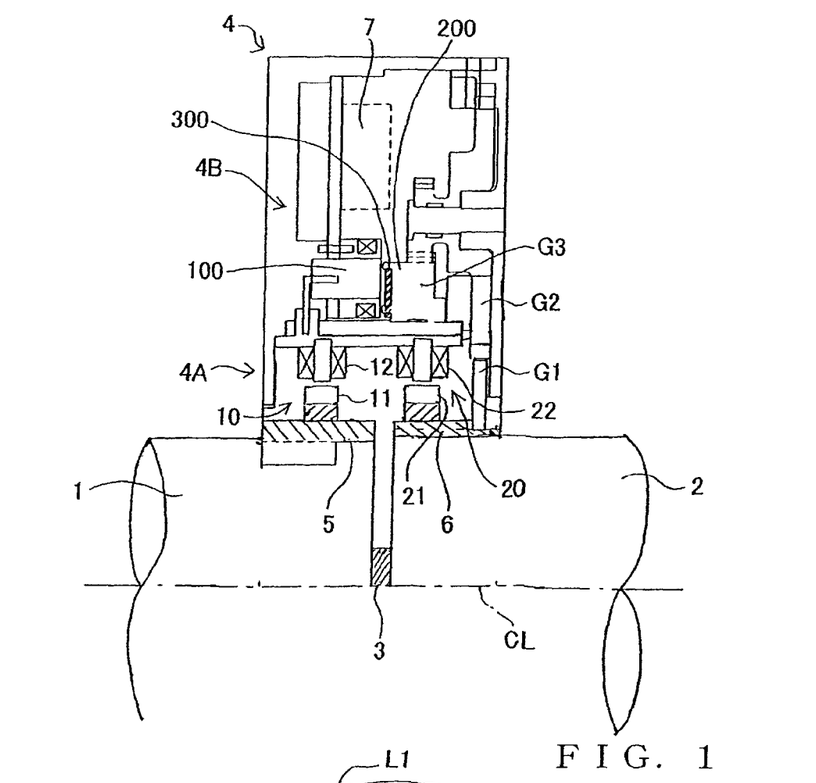
FIG. 1 is a sectional side view showing a relative rotational position detection apparatus in accordance with an embodiment of the present invention.

FIG. 1 is a sectional side view showing a relative rotational position detection apparatus in accordance with an embodiment of the present invention. Here, in connection with a steering wheel of a motor vehicle, there is shown a novel detection system, which includes: detection apparatus of two different functions, i.e. a torque detection apparatus 4A having a function for detecting torsional torque acting on a torsion bar of a steering shaft; and a steering wheel angle detection apparatus 4B having a function as a steering angle (steering shaft rotation) sensor, and in which these detection apparatus 4A and 4B are integrally accommodated in a cylindrical external case 4. Of these detection apparatus, the torque detection apparatus 4A constitutes the embodiment of the relative rotational position detection apparatus of the present invention. Although only an upper half of the side sectional surface is illustrated in FIG. 1 for simplicity, the remaining, lower half, which is vertically symmetrical with the illustrated upper half about an axial centerline CL, appears in a lower section of FIG. 1. However, the steering wheel angle detection apparatus 4B, which comprises a plurality of gears G1-G3, stator section 100, rotor section 200, etc. (see FIG. 6), only has to be provided in at least one position. Of course, the torque detection apparatus 4A and the steering wheel angle detection apparatus 4B may be provided separately rather than being provided integrally within the external case 4. In carrying out the present invention as the relative rotational position detection apparatus (torque detection apparatus 4A), the provision of the steering wheel angle detection apparatus 4B is not necessarily essential.

The relative rotational position detection apparatus (torque detection apparatus 4A) includes a first sensor 10 for detecting, in a noncontact fashion, a rotational position of an input shaft 1 (e.g., first shaft section), and a second sensor 20 for detecting a rotational position of an output shaft 2 (e.g., second shaft section). The input and output shafts 1 and 2 are interconnected by a torsion bar 3 and rotatable relatively to each other through a limited angular range (e.g., up to a range of about +6 degrees to −6 degrees) permitted by torsional deformation of the torsion bar 3. Such a construction with the two shafts (input shaft 1 and output shaft 2) interconnected via the torsion bar 3 is conventionally known in the field of power steering mechanisms of motor vehicles. Whereas the instant embodiment of the relative rotational position detection apparatus (torque detection apparatus 4A) is described here as applied as a torque sensor for detecting torsional torque acting on the torsion bar 3 of the power steering mechanism, the present invention is not so limited, and the relative rotational position detection apparatus of the present invention is of course applicable to all types of relative rotational position detection.

Figure 2:
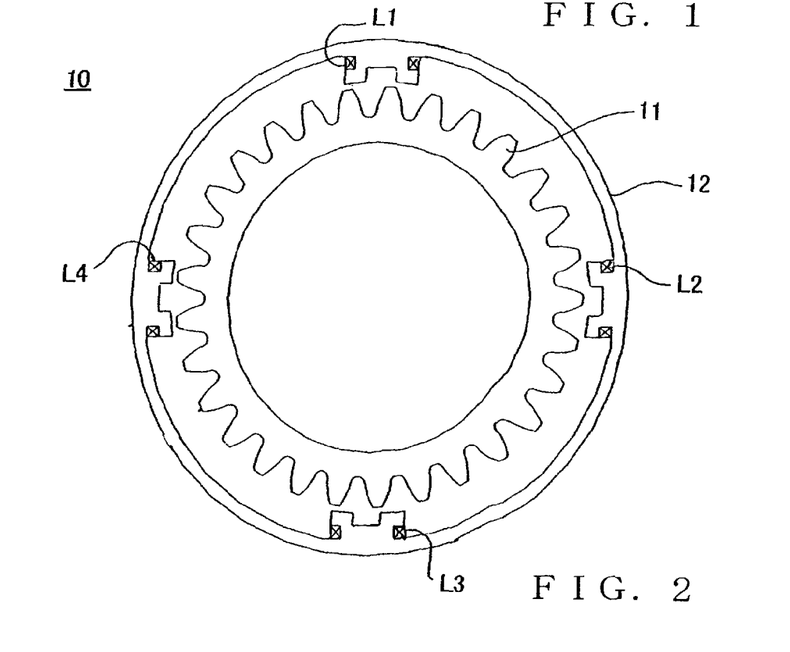
FIG. 2 is a front view showing an embodiment of one sensor employed in the relative rotational position detection apparatus (torque detection apparatus) of FIG. 1.

The first and second sensors 10 and 20 are each of a type that produces an output signal by phase-shifting a reference A.C. signal in accordance with a detected rotational position. FIG. 2 shows one example mechanical construction of the first sensor 10, which comprises an inductive sensor of a variable inductance (variable impedance) type or variable magnetic reluctance type. FIG. 2 is a front view taken in the axial direction of the first sensor 10, where coils are shown in section. The first sensor 10 includes a rotor 11 having a plurality of projections (or teeth) formed of a magnetic substance, such as iron, (or electrically conductive substance as long as the substance is a magnetically-responsive substance), and a stator 12 having four magnetic pole cores provided thereon at 90° intervals along its circumference. Similarly, the second sensor 20 includes a rotor 21 having a plurality of projections (or teeth) formed of a magnetic substance, such as iron, (or electrically conductive substance as long as the substance is a magnetically-responsive substance), and a stator 22 having four magnetic pole cores provided thereon at 90° intervals along its circumference. Input-shaft-sensor mounting ring 5 is mounted on the input shaft 1, and the rotor 11 of the first sensor 10 is mounted on the mounting ring 5. Thus, in the first sensor 10, the rotor 11 rotates integrally with the input shaft 1, and detecting coils provided on the stator 12 detect a rotational position of the rotor 11 and hence the input shaft 1. Output-shaft-sensor mounting ring 6 is mounted on the output shaft 2, and the rotor 21 of the second sensor 20 is mounted on the mounting ring 6. Thus, in the second sensor 20, the rotor 21 rotates integrally with the output shaft 2, and detecting coils provided on the stator 22 detect a rotational position of the rotor 21 and hence the output shaft 2.

The following paragraphs describe an example specific construction of the first sensor 10, with reference to FIG. 2. However, a specific construction of the second sensor 20 will not be described here because the second sensor 20 may be similar in construction to the first sensor 10.

In the first sensor 10, one coil L1, L2, L3 or L4 is fitted in each of the magnetic pole cores of the stator 12, and these coils L1-L4 are energized by a common reference A.C. signal (e.g., sin ωt). On each of the magnetic pole cores of the stator 12, there are formed convex-concave teeth at a predetermined pitch corresponding to a pitch between adjoining projections (or teeth) of the rotor 11. Thus, the convex-concave teeth of each of the magnetic pole cores of the stator 12 are opposed, with an appropriate airgap, to the projections (or teeth) of the rotor 11. As the rotor 11 rotates, correspondency between the convex-concave teeth of each of the magnetic pole cores the stator 12 and the projections (or teeth) of the rotor 11 varies, in response to which reluctance of a magnetic circuit passing through the individual magnetic pole cores varies and thus impedances of the coils L1-L4 provided in the individual magnetic pole cores vary. Such impedance variation occurs with rotational displacement of the rotor 11 corresponding to one pitch between the projections (or teeth) of the rotor 11 as one cycle. In the illustrated example, 29 projections (or teeth) are formed on the rotor 11, and a rotational range corresponding to one pitch is approximately slightly over 12 degrees (360 degrees/29). Because the maximum angular range of the torsional deformation of the torsion bar 3 is about 12 degrees, any torsion amount can be detected appropriately by detecting a rotational angle within a range of one pitch between the projections (or teeth) of the rotor 11.

Correspondency between the magnetic pole cores of the stator 12 and the projections (or teeth) of the rotor 11 is sequentially shifted by quarter (¼) of one pitch. Thus, if a rotational position of the input shaft 1 is indicated with an angular variable θ based on an angular expression of a high-resolution scale using a one-pitch width (about 12 degrees) as 360 degrees, impedance variation A(θ) of an ideal sine function characteristic occurring in the coil L1 can be expressed equivalently a mathematical expression, such as $A(\theta)=P_0+P\sin\theta$ Because the impedance variation does not take a negative value (or does not enter a negative value region), the offset value $P_0$ is equal to or greater than the amplitude coefficient P (i.e., $P_0 \geq P$), and the sum of "$P_0+P\sin\theta$" does not take a negative value in the mathematical expression above.

In the magnetic pole angularly spaced 90 degrees from the aforementioned magnetic pole, there is another correspondency shift of ¼ of one pitch. Thus, ideal impedance variation B(θ) occurring in the coil L2 can be expressed equivalently by a mathematical expression of a cosine function characteristic, such as $B(\theta)=P_0+P\cos\theta$ Similarly, in the magnetic pole angularly spaced 90 degrees from the aforementioned magnetic pole, there is still another correspondency shift of ¼ of one pitch. Thus, ideal impedance variation C(θ) occurring in the coil L3 can be expressed equivalently by a mathematical expression of a minus-sine function characteristic, such as $C(\theta)=P_0-P\sin\theta$ Furthermore, in the magnetic pole angularly spaced 90 degrees from the aforementioned magnetic pole, there is still another correspondency shift of ¼ of one pitch. Thus, ideal impedance variation D(θ) occurring in the coil L4 can be expressed equivalently by a mathematical expression of a minus-cosine function characteristic, such as $D(\theta)=P_0-P\cos\theta$ Note that, because P may be safely regarded as a value "1", P will be omitted in the following description.

Figure 3:
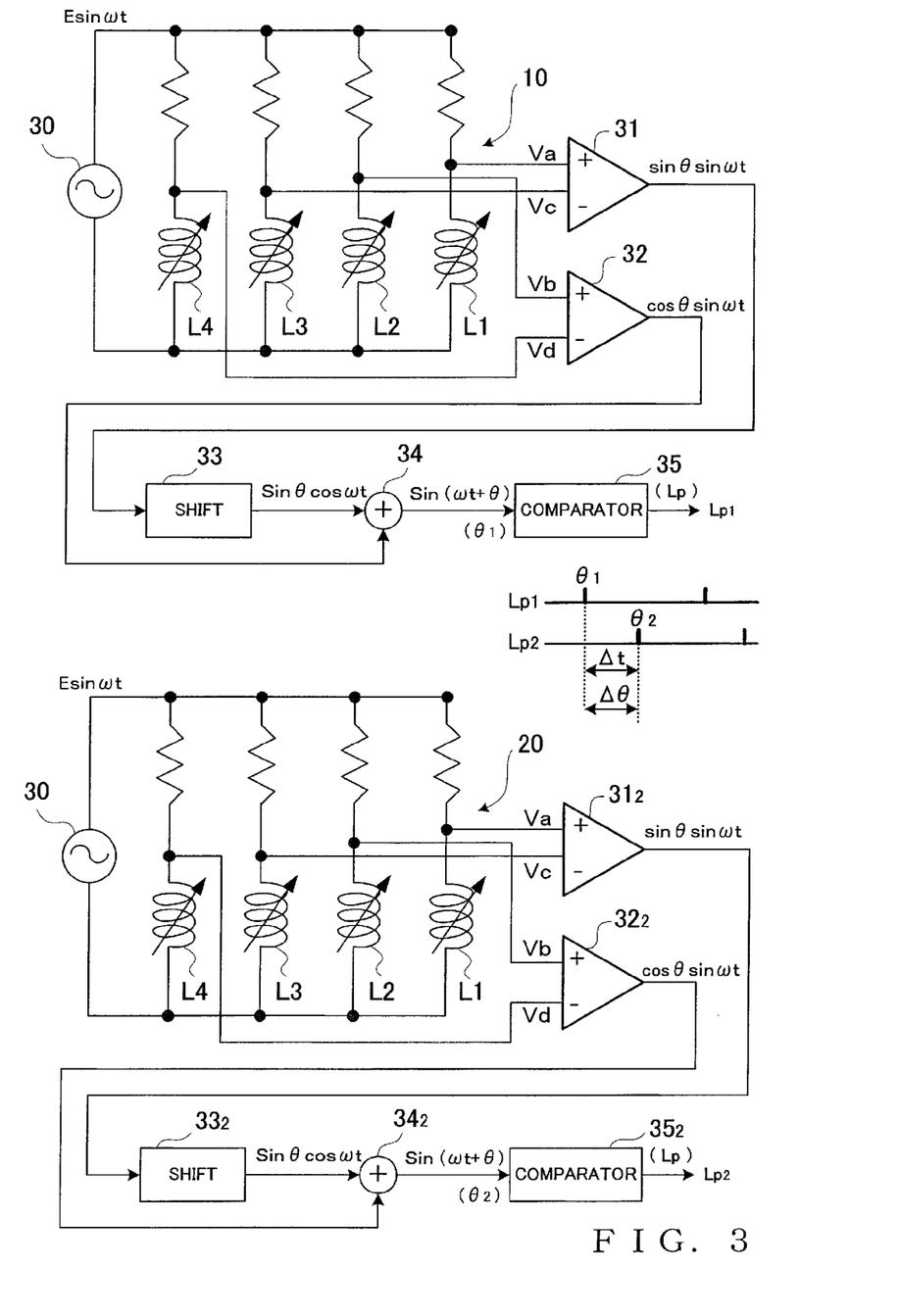
FIG. 3 is a diagram showing an example of electric circuitry pertaining to first and second sensors in the embodiment of FIG. 1.

FIG. 3 shows an example of electric circuitry applied to the relative-rotational-position detection apparatus (torque detection apparatus 4A) of FIG. 1. In FIG. 3, each of the coils L1-L4 is shown equivalently as a variable inductance element. The coils L1-L4 are energized in a single phase by a predetermined high-frequency A.C. signal (for convenience, indicated by E sin ωt) supplied from a reference A.C. signal source 30. As indicated below, voltages Va, Vb, Vc and Vd that are produced in the coils L1, L2, L3 and L4, respectively, present intensity responsive to impedance values of the individual magnetic poles of the stator which correspond to the angular variable θ corresponding to a rotational position to be detected.

$Va=(P_0+\sin\theta)\sin\omega t$ $Vb=(P_0+\cos\theta)\sin\omega t$ $Vc=(P_0-\sin\theta)\sin\omega t$ $Vd=(P_0-\cos\theta)\sin\omega t$ Analog arithmetic operator 31 calculates a difference between the output voltage Va of the coil L1 corresponding to the sine phase and the output voltage Vc of the coil L3 corresponding to the minus sine phase varying differentially relative to the output voltage Va and thereby generates an A.C. output signal having an amplitude coefficient of a sine function characteristic of the angular variable θ, as expressed below.

$$Va-Vc = (P_0+\sin\theta)\sin\omega t - (P_0-\sin\theta)\sin\omega t$$
$$= 2\sin\theta\sin\omega t$$

Analog arithmetic operator 32 calculates a difference between the output voltage Vb of the coil L2 corresponding to the cosine phase and the output voltage Vd of the coil L4 corresponding to the minus cosine phase varying differentially relative to the output voltage Vb and thereby generates an A.C. output signal having an amplitude coefficient of a cosine function characteristic of the angular variable θ, as expressed below.

$$Vb - Vd = (P_0 + \cos\theta)\sin\omega t - (P_0 - \cos\theta)\sin\omega t$$
$$= 2\cos\theta\sin\omega t$$

In this way, there can be obtained two A.C. output signals "2 sin θ sin ωt" and "2 cos θ sin ωt" having been modulated in amplitude with two cyclic amplitude functions (sin θ and cos θ), respectively, that contain the angular variable θ correlating to a relative rotational position to be detected; hereinafter, the coefficient "2" will be omitted for simplicity. The thus-obtained A.C. output signals are similar to a sine-phase output signal "sin θ sin ωt" and cosine-phase output signal "cos θ sin ωt" produced by a conventional detector commonly known as a resolver. Note that the designations "sine-phase" and "cosine-phase" and the representations of the amplitude functions "sine" and "cosine" of the two A.C. output signals are just for illustrative purposes and the "sine" and "cosine" may be replaced with "cosine" and "sine", respectively, as necessary; namely, it is only necessary that one of the amplitude functions be "sine" and the other amplitude function be "cosine". In other words, the output signals of the arithmetic operators 31 and 32 may be expressed alternatively as "Va−Vc=cos θ sin ωt" and "Vb−Vd=sin θ sin ωt", respectively.

Now, a description will be given about compensation of temperature drift characteristics. The impedances of the individual coils L1 to L4 vary in response to an ambient temperature, so that the output voltages Va to Vd of the coils L1 to L4 also change in response to the ambient temperature. However, the A.C. output signals of sine and cosine function characteristics, sin θ sin ωt and cos θ sin ωt, obtained by arithmetically synthesizing the output voltages Va to Vd, can be prevented from being influenced by the coil impedance variation caused by the temperature drift, because temperature drift errors of the coils L1 to L4 are completely compensated for by the arithmetic operations of "Va−Vc" and "Vb−Vd". As a result, the instant embodiment of the present invention permits high-accuracy detection. Further, temperature drift characteristics in other circuit portions, such as the reference A.C. signal source 30, are also automatically compensated in a manner as described below.

In the instant embodiment, the rotational position is detected on the basis of the two A.C. output signals sin θ sin ωt and cos θ sin ωt output from the arithmetic operators 31 and 32 using the phase detection scheme. As the phase detection scheme, there may be used part of the technique disclosed in Japanese Patent Application Laid-open Publication No. HEI-9-126809. For example, an A.C. signal sin θ cos ωt is generated by a shift circuit 33 electrically shifting one of the A.C. output signals, sin θ sin ωt, through an angle of 90 degrees. Then, additive synthesis is performed, via an analog adder 34, between the thus-generated A.C. signal sin θ cos ωt and the other A.C. output signal cos θ sin ωt, so as to generate an A.C. signal sin(ωt+θ) phase-shifted in accordance with the angular variable θ (i.e., signal with the phase component θ converted to an A.C. phase shift amount). Then, a zero-cross point of the phase-shifted A.C. signal sin(ωt+θ) is detected by a comparator 35, to generate a zero-cross detection pulse Lp.

Referring to the first sensor 10, the signal sin(ωt+θ) output from the adder 34 corresponds to a first output signal obtained by phase-shifting the reference A.C. signal sin ωt in accordance with a detected rotational position θ of the input shaft 1. Hereinafter, the rotational position θ of the input shaft 1 is indicated by $\theta_1$, and the first output signal is indicated by $\sin(\omega t+\theta_1)$. Further, the zero-cross detection pulse Lp output from the comparator 35 constitutes a first timing signal corresponding to a phase shift amount $\theta_1$ of the first output signal. Hereinafter, the zero-cross detection pulse Lp, which is the first timing signal corresponding to the rotational position $\theta_1$ of the input shaft 1, is indicated by $Lp_1$.

FIG. 3 also shows coils L1 to L4, arithmetic operators $31_2$, $32_2$, $33_2$ and $34_2$ and comparator $35_2$ of the second sensor 20, which are similar to the aforementioned components of the first sensor 10. If the rotational position θ of the output shaft 2, detected by the second sensor 20, is indicated by $\theta_2$, the output signal $\sin(\omega t+\theta_2)$ from the arithmetic operator $34_2$ corresponds to a second output signal obtained by phase-shifting the reference A.C. signal sin ωt in accordance with a detected rotational position $\theta_2$ of the output shaft 2. Further, the zero-cross detection pulse Lp output from the comparator $35_2$ constitutes a second timing signal corresponding to a phase shift amount $\theta_2$ of the second output signal.

Further, the first timing signal, i.e. zero-cross detection pulse $Lp_1$, output from the comparator 35 indicates, by a time position, a phase shift amount $\theta_1$ corresponding to the rotational position $\theta_1$ of the input shaft 1. Further, the second timing signal, i.e. zero-cross detection pulse $Lp_2$, output from the comparator $35_2$ indicates, by a time position, a phase shift amount $\theta_2$ corresponding to the rotational position $\theta_2$ of the output shaft 2. Thus, a time difference Δt between the first and second timing signals (zero-cross detection pulses $Lp_1$ and $Lp_2$) represents a difference between the rotational position $\theta_1$ of the input shaft 1 and the rotational position $\theta_2$ of the output shaft 2, i.e. relative rotational position Δθ and hence a torsion amount of the torsion bar 3.

Figure 4:
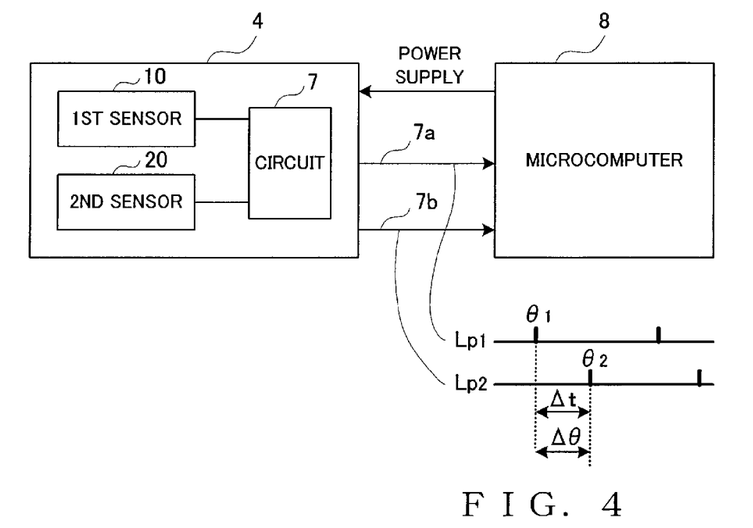
FIG. 4 is a block diagram showing an example detection system where an output of the relative rotational position detection apparatus is coupled to a microcomputer.

The various circuits 30-35 and $31_2$-$35_2$ shown in FIG. 3 are assembled together as a circuit unit 7 on a single circuit board. Then, the circuit unit 7 is placed in the case 4, as illustrated in FIG. 1. In this way, the sensors and the circuit unit 7 are housed compactly in the case 4. FIG. 4 shows an example general setup of a system where the embodiment of the detection apparatus of FIG. 3 housed in the case 4 is connected to a microcomputer 8 that uses detection outputs from the detection apparatus. The microcomputer 8 and the embodiment of the detection apparatus of FIG. 3 may be interconnected only via at least a power supply line and two output lines 7a and 7b. To the two output lines 7a and 7b are supplied, from the circuit of FIG. 3, the first timing signal, i.e. first zero-cross detection pulse $Lp_1$, indicating the rotational position $\theta_1$ of the input shaft 1 by a phase difference $\theta_1$, i.e. time position, from the reference phase, as well as the second timing signal, i.e. second zero-cross detection pulse $Lp_2$, indicating the rotational position $\theta_2$ of the output shaft 2 by a phase difference $\theta_2$, i.e. time position, from the reference phase. The microcomputer 8 includes a plurality of input ports for capturing timing signals, and the above-mentioned output lines 7a and 7b are connected to the input ports, respectively. The microcomputer 8 counts a time difference Δt between two timing signals (pulses $LP_1$ and $LP_2$) supplied via the output lines 7a and 7b, to digitally measure a difference in rotational position Δθ, i.e. relative rotational position, between the input shaft 1 and the output shaft 2. The thus-measured relative rotational position data Δθ is used, as torsion angle detection data of the torsion bar 3, in power steering control.

The microcomputer 8 only has to count the time difference Δt between the two timing signals (pulses $LP_1$ and $LP_2$) supplied via the output lines 7a and 7b, and it is not necessary for the microcomputer 8 to know a phase of the reference A.C. signal sin ωt used in the detection apparatus. As a consequence, processing and construction for measuring the time in the computer side can be simplified. The detection apparatus, on the other hand, only has to generate the reference A.C. signal sin ωt inside the apparatus by means of an analog oscillation circuit, sine wave function generator or the like. The detection apparatus does not have to give the microcomputer 8 the reference A.C. signal sin ωt as a synchronizing reference signal, in which regard too the construction of external terminals can be simplified.

The compensation of temperature drift characteristics will be further described. If, for example, the frequency or amplitude level of the AC signal generated by the reference A.C. signal source 30 or impedance in any other circuit component or signal path has varied due to the temperature drift characteristics, then the phase shift value θ to be detected will include an error ϵ due to the temperature drift characteristics. Because the error ϵ appears in both of the phase data $θ_1$ and $θ_2$ in the same value and in the same direction (same value and same sign), the error ϵ will be automatically cancelled in the time difference Δt between the two timing signals (pulses $Lp_1$ and $Lp_2$). Thus, the instant embodiment can perform high-accuracy detection of the relative rotational position without being influenced by the impedance variation in the circuit etc. due to a temperature drift.

Figure 5:
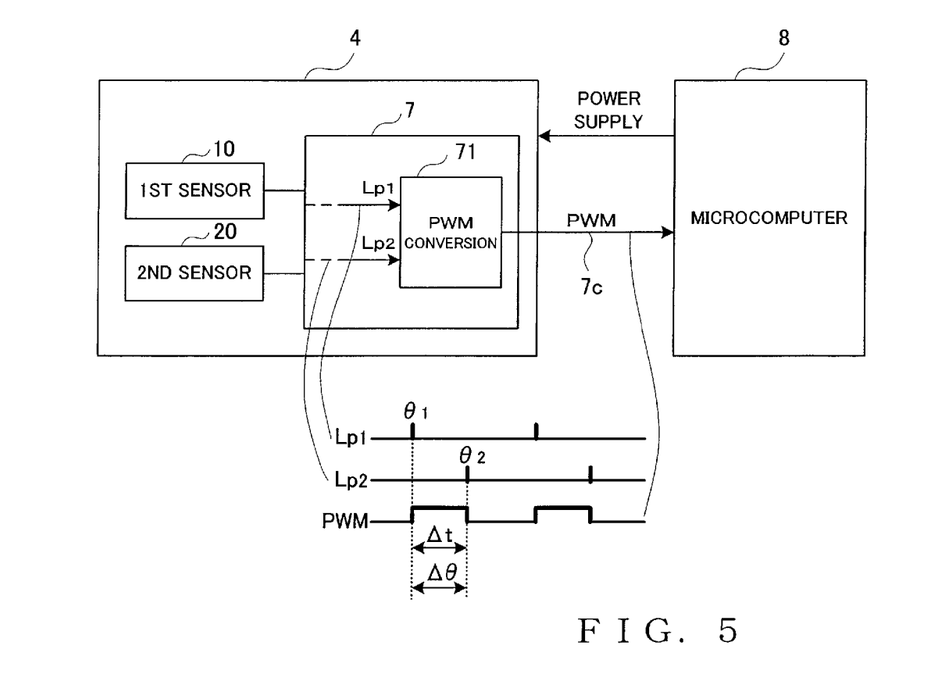
FIG. 5 is a block diagram showing a relative rotational position detection apparatus in accordance with another embodiment of the present invention, where an output of the detection apparatus is coupled to a microcomputer.

FIG. 5 is a schematic circuit block diagram showing another embodiment of the present invention. In the embodiment, the circuit unit 7 further include a PWM conversion circuit 71 that generates a variable-pulse-width signal PWM having a pulse width corresponding to a time difference Δt between the first timing signal indicating a rotational position $θ_1$ of the input shaft 1 by a phase shift $θ_1$, i.e. time position, from the reference phase (namely, first zero-cross detection pulse $Lp_1$) and the second timing signal indicating a rotational position $θ_2$ of the output shaft 2 by a phase shift $θ_2$, i.e. time position, from the reference phase (namely, second zero-cross detection pulse $Lp_2$). The variable-pulse-width signal PWM generated by the PWM conversion circuit 71 and having the pulse width corresponding to the time difference Δt is output to the microcomputer 8 over a single output line 7c. The microcomputer 8 has an input port for capturing the PWM signal, and the above-mentioned output line 7c is connected to this input port. The microcomputer 8 counts the pulse time width Δt of the PWM signal supplied via the line 7c connected to the input port, to thereby digitally measure a rotational position difference Δθ, i.e. relative rotational position, between the input shaft 1 and the output shaft 2. The thus-measured relative rotational position data Δθ is used as torsion angle detection data for the power steering control. Because only one output line 7c is required, the instant embodiment can be even further simplified in construction.

The detection system according to the embodiment of FIG. 1 integrally includes not only the function of the torque detection apparatus 4A for detecting torque applied to the torsion bar 3 of the power steering mechanism, but also the function of the steering wheel angle detection apparatus 4B for detecting a steering wheel angle, corresponding to a rotational position of the steering wheel, with a view to, for example, compensating for a deviation in correspondency between the steering wheel angle corresponding to a rotation amount of the steering wheel and a steerable road wheel.

Describing now the steering wheel angle detection apparatus 4B of FIG. 1, it includes, in respective predetermined positions within the external case 4, a plurality of gears G1-G3, a stator section 100 and a rotor section 200 including a magnetism-responsive member 300. The plurality of gears G1-G3 together constitute a gearing mechanism for rotating the rotor section 200 with the number of rotations of the input shaft 2, coupled to the steering wheel, reduced stepwise; for example, the gearing mechanism reduces the number of rotations of the output shaft 2 at a predetermined ratio, e.g. one rotation of the rotor section 200 per five rotations of the output shaft 2, so that rotational positions throughout multiple rotations of the steering wheel can be detected via a one-rotation type absolute sensor.

Figure 6:
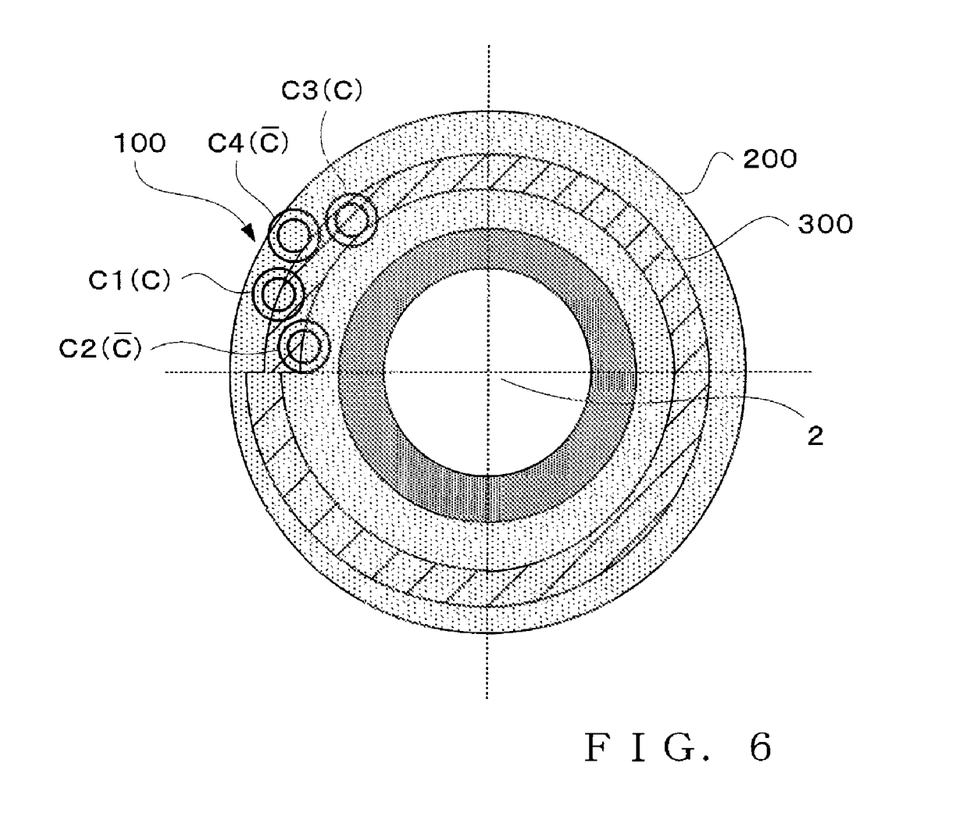
FIG. 6 is a schematic front view showing an embodiment of a steering wheel angle detection apparatus of FIG. 1.

FIG. 6 is a schematic view of an embodiment of the steering wheel angle detection apparatus 4B, which particularly shows, in a schematic front view, physical positional relationship between the coils C1-C4 of the stator section 100 and the magnetism-responsive member 300 formed on the surface of the rotor section 200. The magnetism-responsive member 300 of a predetermined shape is formed on the surface of the rotor section 200 and rotates in response to the rotation of the rotor section 200. The stator section 100 includes, as detecting coils, the four coils C1-C4 (see FIG. 6), and magnetic flux passing through the coils C1-C4 is oriented in the axial direction. The stator section 100 and rotor section 200 are positioned in opposed relation to each other in such a manner that predetermined gaps are formed between respective end surfaces of coil cores (e.g., magnetic cores, such as iron cores) of the four coils C1-C4 and the magnetism-responsive member 300 formed on the surface of the rotor section 200, namely, airgaps are formed between the end surfaces of the coil cores of the four coils C1-C4 and the magnetism-responsive member 300 formed on the surface of the rotor section 200. The rotor section 200 rotates relative to the stator section 100 in a noncontact fashion. Rotational angle of the output shaft 2, i.e. rotational angle of the steering wheel, can be detected by the area of each of the end surfaces of the coil cores of the coils C1-C4, opposed to the magnetism-responsive member 300, varying in response to a rotational position of the rotor section 200.

The instant embodiment of the steering wheel angle detection apparatus 4B, which is in the form of a one-rotation type absolute position detecting sensor based on the electromagnetic induction scheme, includes the plurality of gears G1-G3 of different gear ratios sequentially meshing with each other, the stator section 100 and the rotor section 200. The plurality of gears G1-G3 constitute a speed reducing mechanism for rotating the rotor section 200 with the number of rotations of the output shaft 2 of the steering shaft reduced stepwise. The gear G1 is coupled to the output shaft 2 and rotates in response to the output shaft 2, the speed-reducing gear G2 is meshed with the gear G1, and the speed-reducing gear G3 is meshed with the gear G2. The rotor section 200, formed for example into a disk shape, is provided on the gear G3 and rotates about the axial centerline CL as the gear G3 rotates. In this manner, the gears G1-G3 transmit the rotation of the output shaft 2 to the rotor section 200 with the rotation speed reduced.

On the surface of the rotor section 200, there is provided the magnetism-responsive member 300 of a predetermined shape, such as a helical ring shape. The magnetism-responsive member 300 may be formed of any suitable material that can cause a magnetic coupling coefficient to vary, such as a magnetic substance like iron, an electrically-conductive substance like copper, or a combination of such magnetic and electrically-conductive substances. The following description will be given, assuming that the magnetism-responsive member 300 is formed of a magnetic substance like iron. The stator section 100 is opposed to the thus-constructed rotor section 200 in a thrust direction.

The stator section 100 includes the four coils C1-C4 wound on the respective coil cores (e.g., magnetic cores, such as an iron cores); magnetic flux passing through the coils C1-C4 is oriented in the axial direction. Airgaps are formed between the end surfaces of the coil cores of the four coils C1-C4 and the magnetism-responsive member 300 formed on the surface of the rotor section 200, and the rotor section 200 rotates relative to the stator section 100 in a noncontact fashion in response to rotation of the output shaft 2. Relative position between the rotor section 200 and the stator section 100 is set, via a not-shown mechanism, such that distances of these airgaps are kept constant. Because of the predetermined shape, such as a helical ring shape, of the magnetism-responsive member 300, the area of the end of each of the coil cores, opposed to the magnetism-responsive member 300, varies in accordance with the rotational position of the rotor section 200. Due to variation in the area of the airgaps, the amount of the magnetic flux passing through the coils C1-C4 via the coil cores varies, so that the self-inductance of the individual coils L1-L4 varies. Such inductance variation also means impedance variation of the individual coils L1-L4.

The predetermined shape of the magnetism-responsive member 300 formed on the surface of the rotor section 200 is chosen appropriately so as to obtain, from the coils C1-C4, ideal sine, cosine, minus sine and minus cosine curves. For example, the positions of the coils C1-C4 and the shape of the magnetism-responsive member 300 may be set such that, assuming that the impedance variation occurring in the coil C1 represents a sine function, the impedance variation occurring in the coil C2 represents a minus sine function, the impedance variation occurring in the coil C3 represents a cosine function and the impedance variation occurring in the coil C4 represents a minus cosine function. In such a case, the positions of the coils C1-C4 and the shape of the magnetism-responsive member 300 are set such that, per rotation of the rotor section 200, the impedance of the coil C1 varies in a sine function within the range of 0-900 degrees, the impedance of the coil C2 varies in a minus sine function within the range of 0-90 degrees, the impedance of the coil C3 varies in a cosine function within the range of 0-90 degrees and the impedance of the coil C4 varies in a minus cosine function within the range of 0-90 degrees. Because the impedance variation of the coils C1-C4 can be substantially likened to functional value variation within the range of 0-90 degrees in the sine and cosine functions as noted above, one rotation of the rotor section 200 can be measured by being converted into variation in the 90° phase angle range.

In order to obtain the sine, cosine, minus sine and minus cosine function curves in the 90° range per rotation of the rotor section 200, the predetermined shape of the magnetism-responsive member 300 may be any suitable shape other than the above-mentioned helical ring shape, such as an eccentric disk shape, heart-like shape or the like depending on the design settings, such as the positions, shapes etc. of the coils and coil cores. Because how to design the shape of the magnetism-responsive member 300 is not an object of the present invention and any one of the shapes of magnetism-responsive members employed in publicly-known and unknown variable-magnetic-resistance type rotation detectors of the above-described type may be used in the embodiment, no further description will be given about the shape of the magnetism-responsive member 300.

With the above-described arrangements, the impedances of a pair of the coils C1 and C2 vary differentially, and an A.C. output signal $\sin \theta \sin \omega t$ having a sine function $\sin \theta$ as an amplitude coefficient is obtained through differential synthesis of the outputs from the coils C1 and C2. Further, the impedances of a pair of the coils C3 and C4 vary differentially, and an A.C. output signal $\cos \theta \sin \omega t$ having a cosine function $\cos \theta$ as an amplitude coefficient is obtained through differential synthesis of two outputs from the coils C3 and C4. On the basis of such output signals similar to those of a resolver, the instant embodiment can synthesize A.C. signals shifted in phase by $\theta$ and detect a rotational position of the rotor section 200 by measuring the phase difference value $\theta$. In this way, the rotational angle of the steering wheel through a plurality of rotations (e.g., 2.5 to three rotations) can be detected in an absolute value by being converted into an absolute rotational position within one rotation of the rotor section 200.

Note that the steering wheel angle detection apparatus 4B is not limited to the above-described construction and may be constructed in any other suitable manner. For example, the speed-reducing mechanism constituted by the gears G1-G3 may be dispensed with, and the rotor section 200 may be coupled to the output shaft 2 (or input shaft 1) at a rotation ratio of 1:1. In such a case, only a rotational angle of the steering wheel less than one rotation has to be detected in an absolute value, and a rotational angle of the steering wheel exceeding one rotation may be detected by a number-of-rotation count. Alternatively, a steering wheel angle detection signal may be generated using the first or second sensor 10 or 20 provided on the torque detection apparatus 4A, without any dedicated sensor being provided as the steering wheel angle detection apparatus 4B.

Further, in the above-described torque detection apparatus 4A and/or steering wheel angle detection apparatus 4B, the arrangement patterns, numbers, sizes, etc. of the magnetism-responsive member and coils corresponding thereto are not limited to the above-described and various other arrangement patterns etc. are possible; in short, any suitable arrangement patterns etc. of the magnetism-responsive member and coils may be used as long as they allow output signals of two phases (sine and cosine phases) to be produced from the coil section. Of course, the terms "sine phase" and "cosine phase" used herein are designations selected only for purposes of description, and either one of the two phases may be referred to as the sine phase or cosine phase.

Further, the rotational position detection means (e.g., the aforementioned first and second sensors 10 and 20) used as the torque detection apparatus 4A and/or steering wheel angle detection apparatus 4B is not limited to the above-described construction and principle and may be of any suitable type without being limited to the above-described type. For example, the rotational position detection means is not limited to the type having the primary coil alone, and it may be of a type having primary and secondary coils or of a type using a conventional resolver. In another alternative, the rotational position detection means may be a phase-shift type sensor based on the conventionally-known two-phase (sine/cosine) A.C. energization scheme. Further, the rotational position detection means may be a position sensor or rotation sensor of any suitable type without being limited to the magnetic induction or magnetic coupling type.

Furthermore, the number of the teeth (i.e., number of pitches per rotation) of each of the first and second sensors 10 and 20 may be any suitable number without being limited to 29 as in the above-described embodiment. In another alternative, each of the first and second sensors 10 and 20 may be of other than the multi-tooth type, such as a type which causes impedance variation of one pitch (one cycle) per rotation.

Of course, in the case where the rotational position detection means (e.g., the aforementioned first and second sensors 10 and 20) is implemented by a sensor of a magnetic induction or magnetic coupling type, the positions of the rotor (11, 21) and the stator (12, 22) may be reversed. Namely, the coil section may be constructed as a rotor for rotation with the shaft (1, 2) with a magnetism-responsive member of a predetermined shape, such as a toothed shape having concave/convex tooth portions, being provided as a stationary stator.

Furthermore, the input shaft 1 (first shaft section) and output shaft 2 (second shaft section), as objects of relative rotational position detection by the present invention, need not be separate members interconnected by a torsion bar or the like and may be one integral mechanical shaft. For example, in a case where torsion is produced in a substantial lengthwise middle portion of one mechanical shaft, it is only necessary that the first sensor 10 be provided on a portion of the shaft close to one end of the shaft and the second sensor 20 be provided on a portion of the shaft close to the other end of the shaft.

The means for counting the time difference $\Delta t$ is not limited to the microcomputer 8 or other general-purpose computer operated with a program, and it may be implemented by a dedicated hardware circuitry/device including a counter etc. Further, the counting means may count the time difference $\Delta t$ as an analog value by means of an analog integrator circuit or the like, without being limited to digital counting of the time difference $\Delta t$.

The invention claimed is:

1. A relative rotational position detection apparatus for detecting a relative rotational position between first and second shafts rotatable relative to each other, said relative rotational position detection apparatus comprising:

a first sensor for detecting a rotational position of the first shaft section in a noncontact fashion and generating a first output signal by phase-shifting a reference A.C. signal in accordance with the detected rotational position of said first shaft section;

a second sensor for detecting a rotational position of the second shaft section in a noncontact fashion and generating a second output signal by phase-shifting the reference A.C. signal in accordance with the detected rotational position of said second shaft section; and an output circuit for outputting a first timing signal corresponding to a phase shift amount of said first output signal and a second timing signal corresponding to a phase shift amount of said second output signal, via respective output lines, wherein relative rotational position detection data is outputted via the two output lines extending from said output circuit, and the relative rotational position detection data appears in a time difference between said first timing signal and said second timing signal, and wherein said first and second shaft sections are interconnected via a torsion bar, and an amount of torsion between said first and second shaft sections is detected as a relative rotational position.

2. A relative rotational position detection apparatus for detecting a relative rotational position between first and second shafts rotatable relative to each other, said relative rotational position detection apparatus comprising:

a first sensor for detecting a rotational position of the first shaft section in a noncontact fashion and generating a first output signal by phase-shifting a reference A.C. signal in accordance with the detected rotational position of said first shaft section;

a second sensor for detecting a rotational position of the second shaft section in a noncontact fashion and generating a second output signal by phase-shifting the reference A.C. signal in accordance with the detected rotational position of said second shaft section; and an output circuit for outputting, via an output line, a variable-pulse-width output signal having a pulse width corresponding to a time difference between a first timing signal corresponding to a phase shift amount of said first output signal and a second timing signal corresponding to a phase shift amount of said second output signal, wherein relative rotational position detection data is outputted via the single output line extending from said output circuit, and the relative rotational position detection data appears in a pulse time width of the variable-pulse-width output signal outputted to the single output line, and wherein said first and second shaft sections are interconnected via a torsion bar, and an amount of torsion between said first and second shaft sections is detected as a relative rotational position.

3. A relative rotational position detection apparatus as claimed in claim 1 wherein said first sensor includes a first coil section to be energized by the reference A.C. signal and a first magnetism-responsive member, one of said first coil section and said first magnetism-responsive member is positioned so as to rotate in interlocked relation to said first shaft section while other of said first coil section and said first magnetism-responsive member is positioned in a stationary state, and a relative position between said first coil section and said first magnetism-responsive member varies in accordance with a rotational position of said first shaft section so that magnetic coupling therebetween varies, whereby an impedance corresponding to the rotational position of said first shaft section is produced in said first coil section and an output corresponding to the impedance is produced from said first sensor, and wherein said second sensor includes a second coil section to be energized by the reference A.C. signal and a second magnetism-responsive member, one of said second coil section and said second magnetism-responsive member is positioned so as to rotate in interlocked relation to said second shaft section while other of said second coil section and said second magnetism-responsive member is positioned in a stationary state, and a relative position between said second coil section and said second magnetism-responsive member varies in accordance with a rotational position of said second shaft section so that magnetic coupling therebetween varies, whereby an impedance corresponding to the rotational position of said second shaft section is produced in said second coil section and an output corresponding to the impedance is produced from said second sensor.

4. A relative rotational position detection apparatus as claimed in claim 1 wherein said first and second shaft sections are power steering input and output shafts of a vehicle.

5. A relative rotational position detection apparatus as claimed in claim 1 wherein said first and second shaft sections are sections of a same mechanical shaft, and an amount of torsion between said first and second shaft sections of the mechanical shaft is detected as a relative rotational position.

6. A detection system comprising:

a relative rotational position detection apparatus for detecting a relative rotational position between first and second shafts rotatable relative to each other, said relative rotational position detection apparatus including: a first sensor for detecting a rotational position of the first shaft section in a noncontact fashion and generating a first output signal by phase-shifting a reference A.C. signal in accordance with the detected rotational position of said first shaft section; a second sensor for detecting a rotational position of the second shaft section in a noncontact fashion and generating a second output signal by phase-shifting the reference A.C. signal in accordance with the detected rotational position of said second shaft section; and an output circuit for outputting a first timing signal corresponding to a phase shift amount of said first output signal and a second timing signal corresponding to a phase shift amount of said second output signal, via respective output lines, wherein relative rotational position detection data is outputted via the two output lines extending from said output circuit, and the relative rotational position detection data appears in a time difference between said first timing signal and said second timing signal, and wherein said first and second shaft sections are interconnected via a torsion bar, and an amount of torsion between said first and second shaft sections is detected as a relative rotational position, and a computer having two input terminals for inputting signals of two output lines from the output circuit of said relative rotational position detection apparatus, said computer performing a process for acquiring measurement data of the relative rotational position by measuring a time difference between the first timing signal and second timing signal inputted to the input terminals.

7. A relative rotational position detection apparatus as claimed in claim 2 wherein said first sensor includes a first coil section to be energized by the reference A.C. signal and a first magnetism-responsive member, one of said first coil section and said first magnetism-responsive member is positioned so as to rotate in interlocked relation to said first shaft section while other of said first coil section and said first magnetism-responsive member is positioned in a stationary state, and a relative position between said first coil section and said first magnetism-responsive member varies in accordance with a rotational position of said first shaft section so that magnetic coupling therebetween varies, whereby an impedance corresponding to the rotational position of said first shaft section is produced in said first coil section and an output corresponding to the impedance is produced from said first sensor, and wherein said second sensor includes a second coil section to be energized by the reference A.C. signal and a second magnetism-responsive member, one of said second coil section and said second magnetism-responsive member is positioned so as to rotate in interlocked relation to said second shaft section while other of said second coil section and said second magnetism-responsive member is positioned in a stationary state, and a relative position between said second coil section and said second magnetism-responsive member varies in accordance with a rotational position of said second shaft section so that magnetic coupling therebetween varies, whereby an impedance corresponding to the rotational position of said second shaft section is produced in said second coil section and an output corresponding to the impedance is produced from said second sensor.

8. A relative rotational position detection apparatus as claimed in claim 2 wherein said first and second shaft sections are power steering input and output shafts of a vehicle.

9. A relative rotational position detection apparatus as claimed in claim 2 wherein said first and second shaft sections are sections of a same mechanical shaft, and an amount of torsion between said first and second shaft sections of the mechanical shaft is detected as a relative rotational position.

10. A detection system comprising:
a relative rotational position detection apparatus for detecting a relative rotational position between first and second shafts rotatable relative to each other, said relative rotational position detection apparatus comprising: a first sensor for detecting a rotational position of the first shaft section in a noncontact fashion and generating a first output signal by phase-shifting a reference A.C. signal in accordance with the detected rotational position of said first shaft section; a second sensor for detecting a rotational position of the second shaft section in a noncontact fashion and generating a second output signal by phase-shifting the reference A.C. signal in accordance with the detected rotational position of said second shaft section; and an output circuit for outputting, via an output line, a variable-pulse-width output signal having a pulse width corresponding to a time difference between a first timing signal corresponding to a phase shift amount of said first output signal and a second timing signal corresponding to a phase shift amount of said second output signal, wherein relative rotational position detection data is outputted via the single output line extending from said output circuit, and the relative rotational position detection data appears in a pulse time width of the variable-pulse-width output signal outputted to the single output line, and wherein said first and second shaft sections are interconnected via a torsion bar, and an amount of torsion between said first and second shaft sections is detected as a relative rotational position, and a computer having an input terminal for inputting a signal of an output line from the output circuit of said relative rotational position detection apparatus, said computer performing a process for acquiring measurement data of the relative rotational position by measuring a pulse time width of a variable-pulse-width output signal inputted to the input terminal.

* * * * *